J. A. V. TURCK.
CALCULATING MACHINE.
APPLICATION FILED APR. 24, 1920.
1,391,220.
Patented Sept. 20, 1921.
7 SHEETS—SHEET 1.
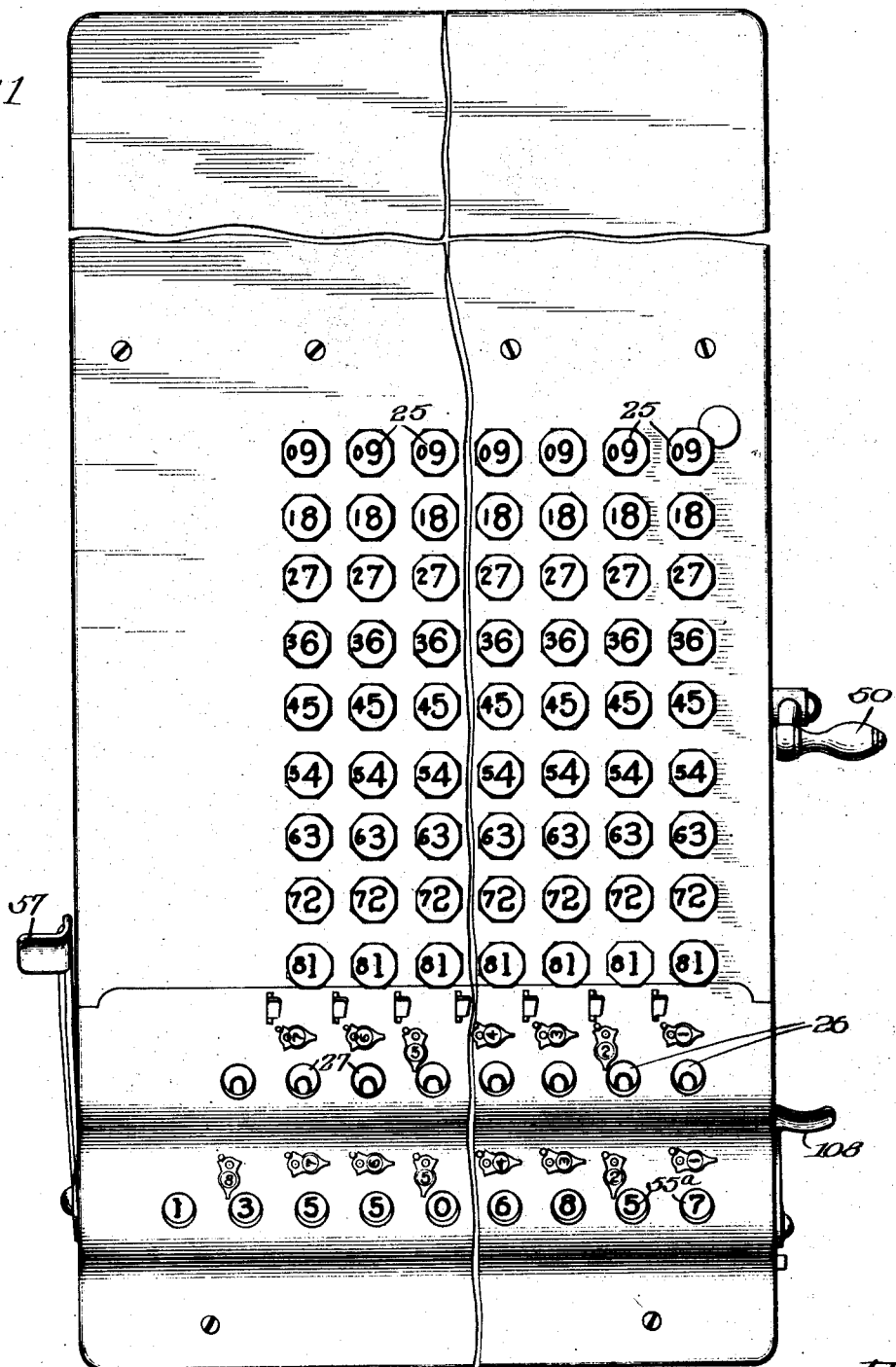

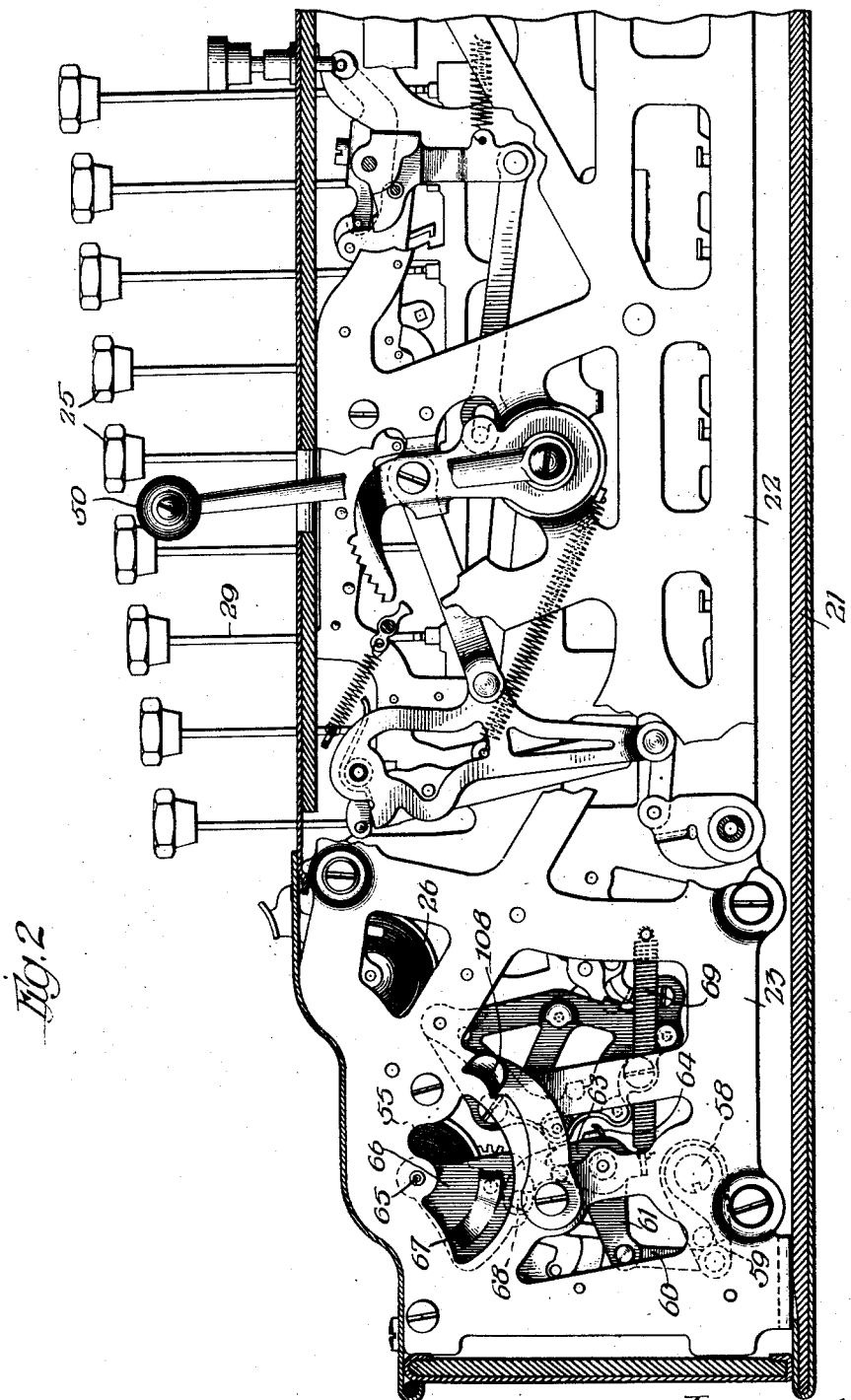

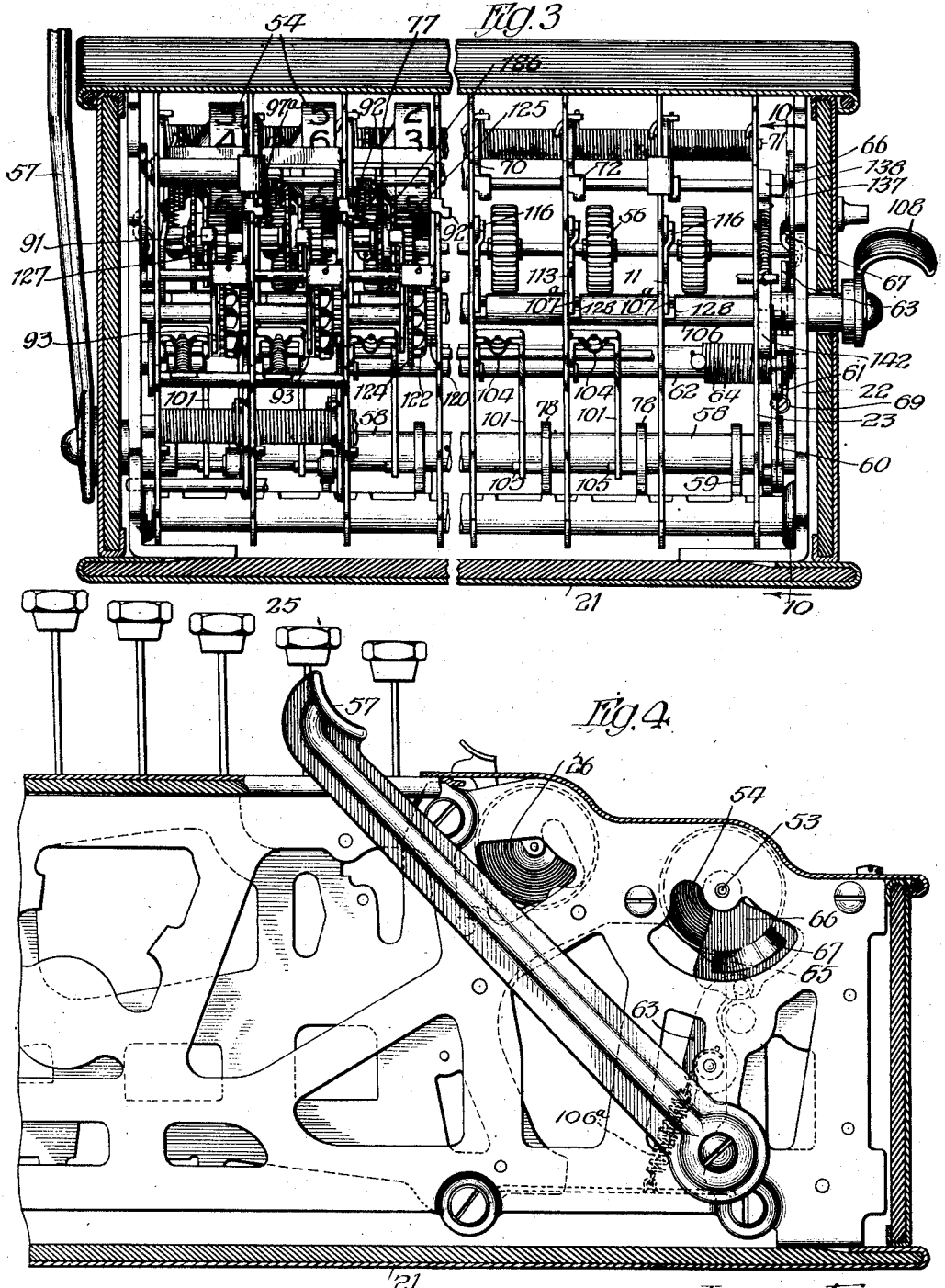

J. A. V. TURCK.
CALCULATING MACHINE.
APPLICATION FILED APR. 24, 1920.
1,391,220.
Patented Sept. 20, 1921.
7 SHEETS—SHEET 4.
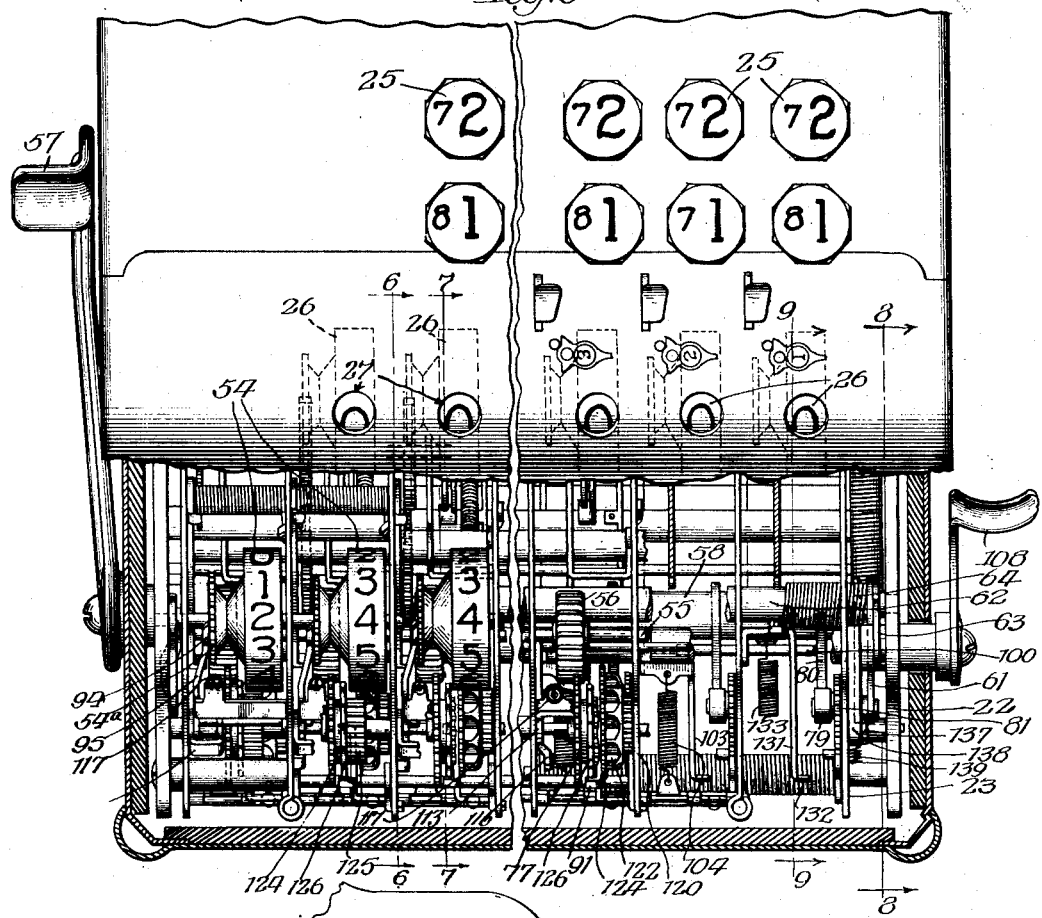
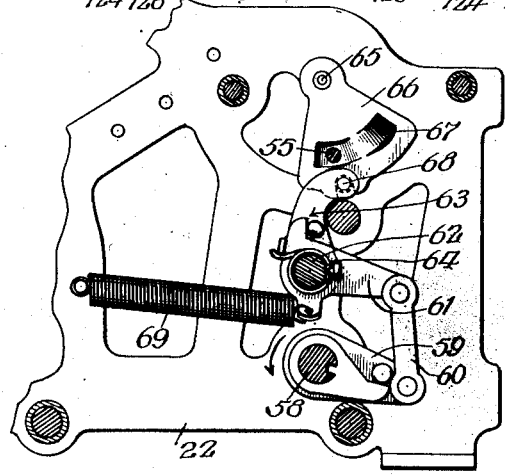
Inventor
Joseph A. V. Turck,
By Munday, Clarke & Carpenter
his Attys

J. A. V. TURCK.
CALCULATING MACHINE.
APPLICATION FILED APR. 24, 1920.

1,391,220.

Patented Sept. 20, 1921.
7 SHEETS—SHEET 5.

Inventor
Joseph A. V. Turck,
By Munday, Clarke & Carpenter
his Attys

J. A. V. TURCK.
CALCULATING MACHINE.
APPLICATION FILED APR. 24, 1920.

1,391,220.

Patented Sept. 20, 1921.
7 SHEETS—SHEET 6.

J. A. V. TURCK.
CALCULATING MACHINE.
APPLICATION FILED APR. 24, 1920.

1,391,220.

Patented Sept. 20, 1921.
7 SHEETS—SHEET 7.

UNITED STATES PATENT OFFICE.

JOSEPH A. V. TURCK, OF WILMETTE, ILLINOIS, ASSIGNOR TO FELT & TARRANT MANUFACTURING COMPANY, OF CHICAGO, ILLINOIS, A CORPORATION OF ILLINOIS.

CALCULATING-MACHINE.

1,391,220.　　　Specification of Letters Patent.　　Patented Sept. 20, 1921.

Application filed April 24, 1920. Serial No. 376,190.

*To all whom it may concern:*

Be it known that I, JOSEPH A. V. TURCK, a citizen of the United States, residing in Wilmette, in the county of Cook and State of Illinois, have invented a new and useful Improvement in Calculating-Machines, of which the following is a specification.

This invention relates generally to calculating machines and more particularly to the provision of an improved registering mechanism that is adapted to supplement the ordinary registering mechanism embodied in calculating machines.

The essential object of the invention is the provision of a registering mechanism, such as above set forth, having a capacity not only for the preservation of totals of individual calculating operations indicated by the ordinary registering mechanism, but also for receiving several or successive totals directly from the ordinary registering mechanism, whereby successive totals indicated upon the ordinary registering mechanism may be transferred to the supplementary registering mechanism of the present invention and a grand total of the several totals so transferred indicated thereby. Any number of totals within the limits of the capacity of the machine may be so transferred from the ordinary registering mechanism to the supplementary registering mechanism with a resultant indication of the grand total upon the supplementary registering mechanism.

The invention has for other objects such other improvements in construction and advantages in operation as may be found to obtain in the mechanism hereinafter described or claimed.

In the accompanying drawings, forming a part of this specification, and showing, for purposes of exemplification, a preferred form and manner in which the invention may be embodied and practised, but without limiting the claimed invention specifically to such illustrative instance or instances:—

Figure 1 is a partial plan view of a calculating machine of the multiple-order key-driven type in which the present improvements are embodied;

Fig. 2 is a partial right hand sectional elevation of the same, with the right hand side plate of the machine removed to illustrate the interior construction;

Fig. 3 is a front vertical sectional elevation with certain of the parts and instrumentalities removed on the right hand side of the figure to illustrate more clearly the interior arrangement;

Fig. 4 is a fragmentary left hand end sectional elevation of the machine, with the left hand side plate removed;

Fig. 5 is a partial plan view of the machine with the front portion of the cover plate removed and with certain of the parts removed in the right hand section of the figure to illustrate the interior construction;

Fig. 8 is a section taken in a plane indicated by the line 8—8 of Fig. 5;

Like characters of reference indicate like parts throughout the several views.

Figure 6:
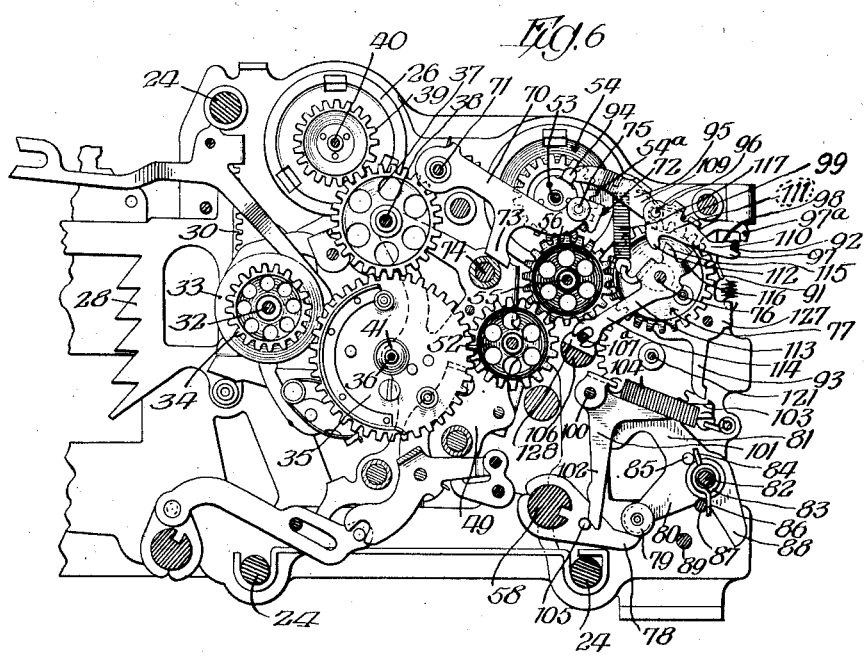
Fig. 6 is a section taken in a plane indicated by the line 6—6 of Fig. 5.

In its present embodiment, the invention is incorporated in a calculating machine of the multiple-order key-driven type, such as the well-known "duplex comptometer," the general character of which is exemplified in the United States patents to Dorr E. Felt Nos. 762,520 and 762,521 dated June 29, 1904, 960,528 dated June 7, 1910, 996,009 dated June 20, 1911, 1,003,723 dated September 19, 1911, and the patent to Kurt F. Ziehm No. 1,110,734 dated September 15, 1914. The invention is particularly adaptable for use in connection with a calculating machine of the multiple-order key-driven type embodying a zeroizing mechanism having the general characteristics disclosed in my co-pending application Serial No. 341,645 filed December 1, 1919. As the details of construction of this type of machine may be readily understood from the prior United States Letters Patent hereinbefore referred to, and my said co-pending application, a brief description of the general features of this type of machine, and such parts as are directly concerned with the operation of the present improvements, will be ample for an understanding of this invention.

The various instrumentalities of the calculating machine are supported by a frame mounted on the base 21 of a casing, said frame consisting essentially of side skeleton plates 22 and intermediate skeleton plates 23 disposed between the various actuating mechanisms of the several orders of the machine and all tied together at suitable points by transverse tie rods 24. A number of columns of nine keys each are provided, each key being indicated by the reference numeral 25, there being a column of nine keys for each numeral wheel 26 of the usual registering mechanism, together with the actuating mechanisms and attendant parts interposed between a column of keys and its corresponding numeral wheel. The registrations indicated by the several numeral wheels 26, which constitute the answer to a calculating operation performed by the machine, may be viewed through sight openings 27 formed in the cover plate of the casing above the respective numeral or registering wheels.

Figure 7:
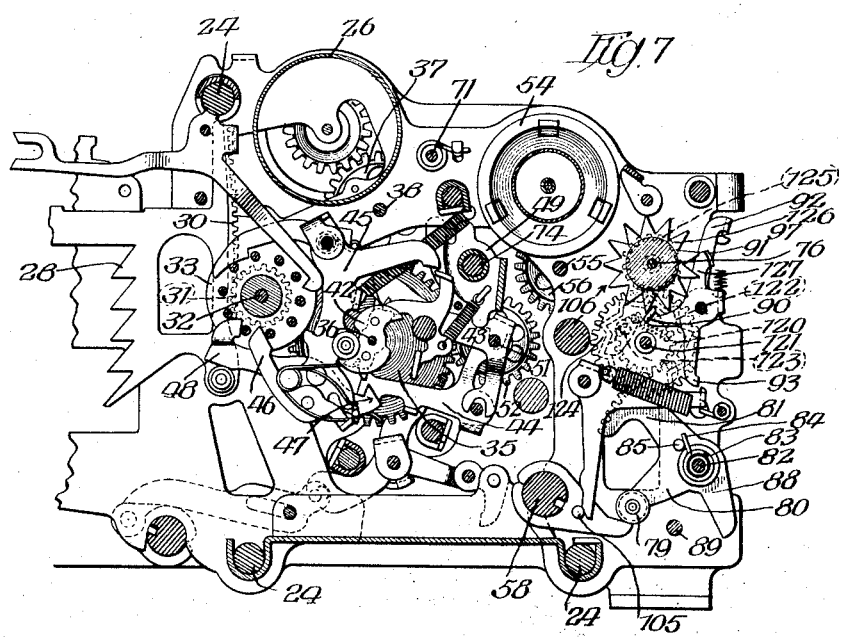
Fig. 7 is a section taken in a plane indicated by the line 7—7 of Fig. 5.

Each column of keys 25 forms a part of an accumulator mechanism for transmitting to its numeral wheel an amount of travel proportionate with the particular key operated and the accumulator mechanism for each column of keys and its corresponding numeral wheel includes a column actuator in the form of a spring-returned segment lever 28, see Figs. 6 and 7, adapted to be depressed an amount determined by the particular key 25 actuated by the operator. Each key is provided with a stem 29 extending down and bearing upon a column actuator 28, and the key at the extreme front of the machine, being farther from the pivotal axis of the column actuator than the key at the extreme rear of the machine moves the column actuator through a lesser arc than does the key last mentioned. It will be understood that the keys of each column are numbered from "1" to "9" in front to rear order of the machine and that the key at the extreme front is adapted to effect actuation of the column actuator through an arc approximately one-ninth of that produced by the operation of the key at the extreme rear of the machine and that upon depression of intermediate keys the column actuator is moved through arcs proportionate with the value of the intermediate key actuated.

The column actuator 28 of each order or column of nine keys of the machine is adapted to impart calculating movement to an accumulator and for this purpose is provided at its forward end with a rack 30 which meshes with an accumulator pinion 31, journaled upon a transverse shaft 32 that extends across the machine and is supported in suitable bearings in the skeleton frame. The pinion 31 of each order forms a part of an internal ratchet mechanism, not herein illustrated, but disclosed in the prior patents hereinabove mentioned and which becomes effective upon the upstroke of the column actuator to clutch the pinion 31 to a lantern wheel 33 and a transmitting pinion or gear 34 that rotates with the lantern wheel and is adapted to mesh with a pinion or gear 35 journaled on a shaft 36 parallel with the aforesaid shaft 32. The gear 35 meshes with an intermediate gear 37 on a transverse shaft 38 and the latter in turn meshes with the numeral wheel pinion 39 journaled on a transverse shaft 40 and fixed to the numeral wheel 26 of the registering mechanism. It will be understood that each time the column actuator is depressed the ratchet mechanism moves idly and hence no motion is transmitted to the gear train beginning with the transmitting pinion 34 and ending with the numeral wheel pinion 39; however, upon the return or upward movement of the column actuator, by the well understood spring action, the transmitting pinion 34 is clutched to the accumulator pinion 31 and the gear train rotates the numeral wheel 26 through the arc determined by the particular key 25 actuated.

Carrying mechanism is provided in each accumulator mechanism for the purpose of actuating the accumulator of the next higher order of the machine each time a carry is to go over from a lower order. For present purposes it will not be necessary to give a detailed explanation of the carrying mechanism, and a brief reference to parts of the carrying mechanism, together with a general statement of their function, will suffice, because ample description of the same will be found in the prior patents and my copending application above mentioned. The carrying mechanism in each order is of the standard "duplex comptometer" type having provision for permitting ordinal keys to be depressed simultaneously and column actuator impulses delivered, in two or more adjacent orders, and yet for preventing any carrying impulses released from a lower one of said orders from being actually delivered to the next higher of said orders until the column actuator movement of such higher order is completed. This operation of effecting simultaneous key-driven actuation of a plurality of column actuators in adjacent orders, the strokes overlapping each other in any manner, is the action that has been referred to as "duplexing." In addition to its function as a member of the gear train for transmitting the motion of the column actuator to the numeral or registering wheel 26, the gear 35 is a carrying motor winding gear and secured thereto is the usual carrying motor spring 41. The other end of this motor spring is secured to the usual carrying escapement member 42 that is adapted to be engaged by first one and then the other of the pair of releasing-detents 43, 44, so that when said escapement member is released by one of the detents, it can make only one-half of a full rotation before being checked by the engagement of the escapement member with the other of said detents; each said half rotation of the escapement member imparts a carrying throw to the bell-crank carrying lever 45 and carrying pawl 46 mounted on said bell crank carrying lever. The ratio of the gears and various parts is such that a complete rotation of the numeral wheel 26 is accompanied by a half rotation of the carrying motor winding gear 35, and at each such half rotation of said gear 35, a 180° throw of the carrying cam escapement member, effected by a release of one or the other of the pair of detents 43, 44 in the usual way, shifts the bell crank carrying lever 45 sufficiently to cause the carrying pawl 46 to throw the lantern wheel ratchet of the next higher or left hand accumulator one numeral space, which movement of the lantern wheel is transmitted through the hereinbefore mentioned train of gears ending with the numeral wheel pinion 39 to effect a carrying transfer from the accumulator mechanism of the lower order to the accumulator mechanism of the next higher order. In order to prevent the carrying escapement member from effecting a carrying throw of the coöperating carrying lever at a time when the accumulator of the higher order is already in motion or is about to be moved by the column actuator that has been or is being depressed by one of the keys in that higher order there is provided a detaining latch tooth 47 formed, as described in my said co-pending application, on the front end of a stop detent 48 in said higher order. The detaining latch tooth 47 moves into position to block the carrying escapement member 42, whenever the column actuator of the higher order has been or is being depressed by one of the keys in that order and thus operates to delay the carry from the lower to the higher order until the column actuator regains its normal elevated position, if a carry has been released by the escapement of one or the other of the detents 43, 44.

Such is, in brief outline, the manner in which prime actuations and carrying-impulses are imparted to the actuator mechanisms in the duplex comptometers of the above mentioned patents. It will be understood that these actuating mechanisms are associated with various stop mechanisms set forth in the said patents, to limit the movements imparted to the actuator mechanisms by the prime actuations and carrying impulses; all of these stop mechanisms are shifted variously into and out of their various stop positions to impose additional restriction to the movements of the carrying-devices and to the prime actuations of the accumulators.

The zeroizing mechanism illustrated in the machine embodying the invention is, broadly stated, of the type disclosed in my co-pending application above referred to, wherein the zeroizing operation, that is, the return of the numeral or register wheels 26 and other parts to the zero positions, is accomplished by disconnecting the connections between the numeral wheels and the actuating devices so that, while retaining the various above mentioned stop devices in their normal relations to the accumulator mechanisms, the stored power in the carrying springs may give to the numeral or register wheels backward rotations so as to move them rearwardly from the divers positions they may occupy and to stop them when they individually arrive at zero positions. Zeroizing is effected by detraining or disengaging the carrying spring winding gears 35 from the transmitting pinions 34. The shaft 32 of the transmitting pinions 34, as well as the shafts 40 and 38 of the numeral wheels 26 and the intermediate gears 37 are mounted in bearings fixed in the frame of the machine. In order to effect detraining or disengagement of the gears 35 from the transmitting pinions 34 the shaft 36 of said gears 35 is carried by a swinging frame that is adapted to have a restricted outward pivotal movement on an axis coincident with the aforesaid shaft 38. This swinging frame in general comprises partition plates 49 connected together at suitable points by transverse tie rods to form a unitary structure and is under the control of a zeroizing lever 50, as shown in Fig. 2. On operation of the zeroizing lever 50 to effect canceling or zeroizing, i. e., toward the left as viewed in Fig. 2, connections including toggles fully set forth in my said co-pending application are operated to shift the swinging frame outwardly with the result that the carrying winding gears 35 are detrained from the transmitting pinions 34, and the numeral wheels 26 are rotated reversely to zero positions. The zeroizing lever 50 is returned to normal position, independently of the swinging frame, by spring action. For restoring the swinging frame to normal position to entrain the aforesaid gears 35 with the transmitting pinions 34, ordinal key-controlled means is provided, which means is rendered operative upon the first key 25 actuated by the operator subsequent to a zeroizing or canceling operation. The operation of this first key releases power connections which thereupon become effective to restore the swinging frame to gear entraining position.

The present invention is more particularly concerned with the provision of a registering mechanism supplemental to the ordinary registering mechanism that is actuated by the prime actuators and that is adapted to be operated in connection with the ordinary registering mechanism hereinabove described, whereby a set of figures indicated on the ordinary numeral wheels 26 may be quickly and efficiently transferred to the numeral wheels of the supplemental registering mechanism and the total indicated on the ordinary numeral wheels thus preserved. Improved carrying mechanism is provided in the supplemental registering mechanism, so that it has a capacity for successive registrations, with the result that several totals in successive or other order may be transferred from the ordinary numeral wheels to the numeral wheels of the supplemental registering mechanism and a grand total of the individual totals so transferred indicated on the numeral wheels of the supplemental registering mechanism. The supplemental registering mechanism is thus not only useful for preserving totals of individuals calculating operations performed on the machine but also for giving the grand total of such individual totals as may be transferred from the ordinary registering mechanism to the supplemental registering mechanism. For convenience, and to distinguish the supplemental registering mechanism of the present invention from supplemental registering mechanisms of a capacity limited to the preservation of individual totals, a registering mechanism constructed in accordance with the present invention will be hereinafter designated as "the super-totalizer registering mechanism."

Mounted in the side plates 49 of the swinging frame hereinabove described is a transverse shaft 51 which carries a set of pinions 52 in mesh with the carrying winding gears 35. The pinions 52 are for the purpose of transmitting the motion of the carrying winding gears, when the latter are being turned rearwardly to zero positions in the zeroizing operation, to the gearing of the super-totalizer registering mechanism, in a manner which will be fully set forth hereinafter. Supported by the fixed frame in front of and in a lower plane than the shaft 40 of the ordinary numeral wheels 26 is a transverse shaft 53 and journaled on said shaft 53 are the numeral wheels 54 of the super-totalizer registering mechanism. The numeral wheels 54 are provided with a set of peripherally arranged figures or other indicia corresponding to the indicia of the ordinary numeal wheels 26 and adapted to be viewed through a set of sight openings 55ª formed in the top casing plate directly above the numeral wheels of the super-totalizer registering mechanism.

The arrangement provides for connecting at will the gearing of the ordinary registering wheels 26 with gearing of the super-totalizer registering wheels 54, to utilize power developed in the before-mentioned zeroizing operation which effects backward turning of the ordinary registering wheels individually to zero positions. In the present embodiment, the power thus derived by the establishment of this connection is translated by the gearing into rotary movements of the super-totalizer registering wheels forwardly with respect to the indicating numbers thereupon and through degrees or numeral spaces corresponding with the degrees of movement of the several ordinary registering wheels, when turning rearwardly to zero positions. The power stored up in the carrying motor springs of the ordinary registering wheels may thus function not only to return the ordinary registering wheels to zero but also to transfer the set of figures or the answer indicated on the ordinary registering wheels to the super-totalizer registering wheels. Mounted in the fixed frame is an axially-movable shaft 55 having journaled thereon a set of controlling pinions respectively formed with axially, elongated teeth, as shown in Figs. 3 and 5. These controlling pinions 56 are constantly in mesh with driving pinions 54ª respectively fixed to the super-totalizer registering wheels 54. On shifting the shaft 55 carrying these pinions 56 axially in one direction, in the present instance toward the left as viewed in Figs. 3 and 5, the controlling pinions 56 are moved into position for being meshed with the respective transmitting pinions 52, whenever the swinging frame supporting such pinions 52 is swung into the outward zeroizing position hereinbefore mentioned. The controlling pinions 56 are detrained from the transmitting pinions 52 whenever the carrying spring winding gears 35 are entrained with the transmitting pinions 34 to permit the normal operation of the numeral wheels 26 by the prime actuators hereinbefore mentioned.

Manually controlled means is provided for effecting the axial movement of the shaft 55 to shift the controlling pinions 56 into the position for being entrained as above set forth. On the left hand side of the casing, as viewed in Figs. 1, 3 and 5, is an operating handle 57 that is adapted to actuate a shaft 58 supported by and extending transversely through the frame of the machine. Fixed on the opposite ends of the shaft 58 are crank arms 59 that are respectively connected by pivotal links 60 with crank arms 61 on a transverse shaft 62 mounted above the hereinbefore mentioned shaft 58. Journaled on the opposite ends of the shaft 62 in proximity with the arms 61 are arms 63 respectively connected with the shaft 62 by means of springs 64 of such strength as to transmit normally the motion of the arms 61 through the shaft 62 to the latter arms 63, but adapted to yield on abnormally powerful thrusts imparted to the arms 61 to prevent the transmission of damaging stresses to the parts of the machine. Pivoted at 65 on the opposite side plates of the fixed frame are cam segments 66 respectively provided with cam surfaces 67. These cam segments 66 are also pivoted at 68 to the upper ends of the before-mentioned arms 63. The cam surfaces 67 of the segments 66 are adapted to engage the opposite ends of the axially-movable shaft 55 carrying the controlling pinions 56 and on a clockwise rocking of the segments 66 the shaft 55 is shifted by the engaged cam surfaces 67 at its opposite ends toward the left with the attendant function hereinbefore set forth. Rocking of the cam segments 66 in unison in the return direction, i. e., counter clockwise, effects a shifting movement of the shaft 55 toward the right with an attendant movement of the controlling pinions 56 out of the path of movement of the transmitting pinions 52 of the swinging frame. The rocking movement of the cam segments 66 is coincident with a depression of the super-totalizer lever 57 which imparts a counter clockwise rotation to the shaft 58 attended by a counter clockwise rotation of the shaft 62 transmitted through the connections 59, 60 and 61, and a clockwise rocking of the cam segments 66 transmitted through the arms 63. On release of the operator's hand from the super-totalizer lever 57 springs 69 connecting the arms 61 with a fixed part of the main frame act to restore the handle 57, segments 66 and intermediate connections to the normal positions, indicated in Fig. 8.

A locking mechanism is provided for preventing rotation of the controlling pinions 56 when being shifted axially by the means set forth, whenever the swinging frame is in the retracted position for entraining the gears 35 with the pinions 34. The purpose of this locking mechanism is to prevent free rotation of the controlling pinions 56 and their connected registering wheels 54 during the shifting movement of the shaft 55 and thus to lock the registering wheels 54 against turning, until the swinging frame has been moved to enmesh the gears 52 with the controlling pinions 56. Companion to each pinion 56 is a lock 70 (see Fig. 6) pivoted at 71 on the fixed frame and provided at its free end with a detent 72. Also formed on each lock 70 is a depending arm 73. Extending transversely through the swinging frame is a lock-controlling or releasing bar 74 adapted to engage the depending arms 73 of the several locks 70. Movement of the swinging frame into the retracted position withdraws the bar 74 from engagement with the depending arms 73 of the several locks 70 and permits the latter to move downwardly so as to permit the detents 71 carried at their outer ends to enter the teeth of their companion controlling pinions 56 and prevent turning movement of said pinions during the axial shifting of the shaft 55. On movement of the swinging frame outwardly into the zeroizing position, however, the bar 74 engages the depending arms 73 of the several locks 70 and in so doing lifts said locks to elevate the detents 71 out of engagement with the teeth of the pinions 56. By this time however the super-totalizer transmitting pinions 52 have come into mesh with the controlling pinions 56, so as to prevent any movement of the controlling pinions 56 other than the positive movement imparted to them by the reverse zeroizing motion of the carrying spring winding gears 35. The several locks 70 are guided in their movements by studs 75 formed on their outer ends and adapted to work in slots cut out of the side plates of the fixed frame.

With the above described construction, it will be noted that two conditions are essential before transfer of a total from the ordinary registering wheels 26 to the super-totalizer registering wheels 54 can be effected, i. e., the super-totalizer lever must be in depressed position and the swinging frame must be shifted into position for zeroizing the ordinary registering wheels. In the normal operation of transferring the total from one set of wheels to the other, the super-totalizer handle is depressed by the left hand of the operator and the zeroizing lever is then actuated by the right hand or a finger of the right hand of the operator. This operation results in clearing the several wheels of the ordinary registering mechanism and in the movement of the wheels of the super-totalizer registering mechanism to indicate the set of figures cleared from the wheels of the ordinary registering mechanism.

The invention further provides an improved carrying mechanism embodied in the super-totalizer registering mechanism in order to permit the transfer of a plurality of totals from the ordinary registering mechanism to the super-totalizer registering mechanism and the indication of a correct grand total on the super-totalizer registering mechanism. The carrying mechanism provided in accordance with the invention is detained or restrained in its operation during the step of transferring the total from the ordinary registering wheels to the super-totalizer registering wheels, that is, while the controlling pinions 56 are entrained with the super-totalizer transmitting pinions 52 and is released for operation to permit carriers to go over from lower to the next higher orders when the super-totalizer lever 57 has been released and regains its normal elevated position. This insures a carrying operation in each order of the machine where a carry is to be effected, by preventing loss of the carrying impulse in the motion transmitted to the gears of the super-totalizer registering mechanism by the entrained gears of the ordinary registering mechanism. Journaled on a transverse shaft 76 supported by the fixed frame of the machine and companion to the various orders of the super-totalizer registering wheels 54 are carrying gears 77 that are adapted to transmit carrying impulses released individually by lower orders to their next higher orders. These carrying gears 77 are so positioned with relation to the controlling pinions 56 that they are out of mesh with said controlling pinions 56 when the latter have been shifted by the shaft 55 into position for being meshed by the transmitting pinions 52 of the swinging frame. In other words, the carrying gears 77 are in mesh with the controlling pinions 56 only when the latter are in normal position. Power for imparting carrying impulses to the several carrying gears 77 is stored up in the mechanism by the depression of the super-totalizer operating lever 57 and the power so stored is kept in reserve until a zeroizing operation of the super-totalizer registering wheels 54 has been effected. Means is provided for controlling and releasing this power in such manner that individual carrying impulses are released in the several individual orders of the super-totalizer registering mechanism whenever a carry is to go over from lower orders to their next higher orders, but such carrying impulses are detained so long as the carrying gears 77 are out of mesh with the controlling pinions 56. Thus the carrying impulses in several orders are released when the super-totalizer operating lever 57 regains its normal elevated position. Fixed on the shaft 58 of the super-totalizer operating lever 57 are crank arms 78 companion to the various orders of the super-totalizer registering mechanism and adapted to engage and operate dolly-rolls 79 carried by arms 80 of toothed segments 81. The several tooth segments 81 are journaled on the transverse shaft 82 supported by the fixed frame and are individually connected with individual power springs 83 encircling the shaft 82 and respectively arranged with their ends 84 in engagement with studs 85 projecting from the segments 81 and with their ends 86 in engagement with studs 87 projecting from the intermediate plates of the fixed frame. In the operation of this motor device, a counter clockwise rotation of the shaft 58 effected by depression of the super-totalizer operating lever 57 lifts the several arms 78 carried by said shaft 58 and the lifting of said arms through their engagement with the dolly-rolls 79 of the segments 81 transmits a clockwise motion to said segments on their shaft 82, thereby winding the several springs 83 connected with said segments. Depending arms 88 carried by the several segments 81 are adapted to engage a rod 89 extending transversely through the fixed frame and in so doing to limit the forward or winding movement of said segments 81.

The several segments 81 are respectively in mesh with pinions 120 journaled on a transverse shaft 121 supported by the fixed frame and said pinions are respectively fixed to and rotatable with internal ratchets 122 also journaled on said shaft 121. The ratchets 122 are companion to the various orders of the super-totalizer registering mechanism and the internal teeth thereof are adapted to coöperate with internal pawls 123 respectively carried by gears 124 also journaled on the shaft 121. During the winding movement of the ratchets 122, the companion pawls 123 slip idly against the ratchet teeth and no motion is transmitted to the gears 124. The gears 124 mesh with pinions 125 journaled on the shaft 76 and respectively fixed to the carrying gears 77 and also to pallet wheels 126, it being understood that the pallet wheel 126, pinion 125 and carrying gear 77 of each order rotate in unison. The pallet wheels 126 are in the form of star wheels and constitute part of a pallet escapement for controlling motion imparted to the carrying gears 77 by the spring operated segments 81 through the above described gearing connecting said carrying gears 77 individually with their companion segments 81. Coöperating with the several pallet wheels 126 are pallets 127, each having a pair of escapement cam detents 90, 91 adapted to engage in alternation teeth of their companion pallet wheels. Each pallet 127 is furthermore provided with an upstanding releasing detent 92 and with a depending carry-detaining-detent 93.

With this construction, an intermittent escapement motion is imparted to the pallet wheel 126, whenever the pallet 127 is released by means of mechanism hereinafter described. In operation the wheel 126 acts as a driving member receiving its power through the gearing from the spring 83 and the pallet 127 as a driven member, whose cam detents 90, 91 by reason of their alternate engagement with the teeth of the wheel 126 and the resultant camming action, act to give motion to the pallet, which in turn acts to control the intermittent escapement of the pallet wheel.

Projecting from the numeral wheel pinions 54$^a$ of the several orders of the super-totalizer registering mechanism and located in radii coinciding approximately with the zero points of the several numeral wheels 54 are carry-releasing lugs 94 coöperating respectively with the carrying levers 95 pivoted at 96 on the intermediate plates of the fixed frame. The extreme forward ends of said carrying levers 95 are formed with notched detents 97 and with stops 97ᵃ above said detents 97 adapted individually to coöperate with the releasing detents 92 of the individual pallets 127. In accordance with the present arrangement, the carrying levers 95 of each lower order throughout the super-totalizer registering mechanism controls the operation of the pallet wheel and carrying gear of the next higher order. Assuming that a numeral wheel 54 of the super-totalizer registering mechanism is passing from the nine point to the zero point, a carry must then be transferred to the next higher order, i. e., the next higher numeral wheel. During the motion of the numeral wheel of the lower order from nine to zero the carry-controlling lug 94 is moved underneath the inner end of the carrying lever 95, thereby lifting the inner end of said lever and depressing its forward end. As a result of this operation, the releasing detent 92 of the pallet 127 is released from the notched detent 97 of the carrying lever and may consequently ride over the shoulder 98 of the carrying lever above said detent 97. This action permits a counter clock wise rocking of the pallet 127 resulting in a movement of the escapement detent 90 out of engagement with a tooth of the pallet wheel 126 and a concurrent movement of the escapement detent 91 into engagement with a tooth of the pallet wheel 126. The ratio of the escapement detents 90, 91 to the teeth of the pallet wheel 126 is such that the pallet wheel is released from the restraining influence of either one or the other of said escapement detents 90, 91 for a period sufficient to permit the spring-actuated segment 81 geared to the carrying gear 77 in the same order as the pallet wheel, to impart a counter clockwise rotation to the carrying gear 77 through an arc sufficient to move forwardly the numeral wheel 54 of the next higher order one numeral space. At the end of the carrying impulse, the escapement detent 91 moves into engagement with a tooth of the pallet wheel 126. On further rotation of the numeral wheel 54 of a lower order the carry-controlling lug 94 is shifted beyond the inner end of the carrying lever 95 permitting the inner end of said lever to be depressed under the influence of the spring 99 of the carrying lever, with a resultant elevation of the front end of the carrying lever to lift the notched detent 97 into locking engagement with the releasing detent 92 of the pallet 127, this locking movement of the carrying lever 95 effecting a slight clockwise movement to the pallet 127 to restore the escapement detent 90 into restraining engagement with the tooth of the pallet wheel 126 and move the escapement detent 91 out of engagement with a tooth of said pallet wheel. As the notched detent 97 moves beneath the pallet-detent 92 to release the pallet 127, the before-mentioned stop 97ᵃ is concurrently lowered in front of said pallet-detent 92, with the result that, the pallet 127 can move only so far as is necessary to permit the detent 92 to be reëngaged and held by the carrying-lever-detent 97, such reëngagement being compelled by the cam-face on the front edge of the detent 92 co-acting with the opposed cam face on the inner side of the stop 97ᵃ requiring such stop to lift only concurrently with the lifting of the detent 97 into position to block another carrying movement of the detent 92, thereby avoiding an erroneous repetition of the carrying impulse. Such coaction between the opposed camming faces of the detent 92 and stop 97ᵃ operates on the one hand, to enforce lifting of the stop 97ᵃ and detent 97, if their lifting is retarded, and, on the other hand to check or stop the reciprocation of the detent 92 until the detent 97 shall have been lifted into blocking position, inasmuch as the return or rearward stroke of the detent 92 cannot commence until the completion of its forward stroke, which cannot be completed until the stop 97ᵃ is lifted or cammed into the raised position concurrently with the lifting of the carrying-lever-detent 97 into blocking position underneath and behind the detent 92. This is thus in effect a pallet motion. During a carrying impulse imparted to a next higher order, the pawl 123 is clutched to an interior tooth of the ratchet 122 to establish a gearing connection with the counter clockwise moving segment 81. Power for effecting the carrying impulses is restored to the several spring actuated segments 81 each time the super-totalizer operating lever 57 is depressed, said lever acting to rewind all of the segments 81 which have performed carrying impulses during a previous operation of the super-totalizer mechanism. In the operation of the machine, there will be normally several orders in which no carrying impulses have been released; in such orders no power has been used and consequently the depression of the actuating lever 57 will have no effect on the companion segments 81, operating in those orders, said segments remaining undisturbed in their completely wound position until carrying impulses have been released by the operation of the mechanism above described.

It has been mentioned hereinbefore that the controlling pinions 56 are detrained from the companion carrying gears 77 when the super-totalizer operating lever 57 is depressed to shift them into position for being entrained with the transmitting pinions 52 of the swinging frame and, to prevent loss of carry in this arrangement, means is provided for detaining carrying impulses released by the carrying levers 95 in any of the several orders of the super-totalizer registering mechanism, such carry detaining means being in operation so long as the controlling pinions 56 are detrained from the carrying gears 77, i. e., whenever the super-totalizer actuating lever is in any position other than its normal elevated position. In the present embodiment of the invention, the detaining means for preventing loss of carry is constructed as follows:—pivoted to a cross-wire 100 supported in the intermediate plates of the fixed frame, are bell crank carry-detaining latches 101 having depending vertical arms 102 and horizontal arms 103 formed with detents at their outer ends and adapted to be shifted into latching relation with respect to the depending latch detents 93 of the companion pallets 127. Spring 104 connecting the carrying detaining latches 101 with fixed portions of the frame act on said carry detaining latches 101 to shift their horizontal arms 103 normally out of the zones of restraining influence with respect to the depending latch detents 93 of the pallets 127. The depending arms 102 of the detaining latches 101 are adapted respectively to be engaged by studs 105 projecting from the crank arms 78 of the operating lever shaft 58. On movement of said crank arms 78 by the shaft 58 resulting from a depression of the operating lever 57, the studs 105 bearing against the depending arms 102 of the carry detaining latches 101 shift said latches 101 to move the detents formed at the ends of the arms 103 into detaining positions in front of their companion latch detents 93 of the pallets 127. When the detents of the carry detaining latches are in their detaining positions, sufficient clearance is provided between said detents and the detents 93 of the pallets 127 to permit the releasing detents 92 of the pallets to pass over the shoulders 98 of the carrying levers 95 enough to be unlatched whenever said carrying levers 95 are operated by the carrying lugs of the numeral wheels to release a carry from a lower order to the next higher order. Otherwise the detained carrying impulses released by the carrying levers in the lower orders might be lost, before the release of the detaining latches 101 is effected.

Zeroizing mechanism is provided in the present arrangement for returning the numeral wheels 54 of the super-totalizer registering mechanism to zero positions. According to the illustrated embodiment of the invention, the power stored up in the carrying gearing by the winding of the segments 81 is utilized for moving the several numeral wheels 54 forwardly to zero. The zeroizing operation is controlled and effected by means of the following instrumentalities; journaled in the fixed frame of the machine is a transverse rock shaft 106 formed with a plurality of notches 107 (see Fig. 3) companion to the several orders of the super-totalizer registering mechanism, and with a rod 107ᵃ set in a groove extending axially in said rock shaft 106. At its right hand end, the rock shaft 106 is provided with a super-totalizer zeroizing lever 108 located beyond the right hand side plate of the outer casing. Each carrying lever 95 is composed of two members—a rear member 109 and a front member 110. Both members of the carrying lever 95 are mounted on the axis 96 and are retained in their normal relative positions by the spring 99 which bears underneath lips formed respectively on the members 109 and 110 to prevent relative movement during the normal carrying operations hereinbefore described. The rear member 109 of each carrying lever is provided with a contact surface 111 that extends forwardly of the axis 96 and the front member 110 is formed, at about its rear end, with a depending projection 112. Mounted on the shaft 76 and companion to the carrying levers 95 of the several orders of the super-totalizer registering mechanism are cam levers 113. These cam levers 113 are formed with rearwardly depending arms 114, having jaws 114ᵃ adapted to fit in the notches 107 of the before-mentioned zeroizing rock shaft 106 and embrace the rod 107ᵃ carried by said shaft; said cam levers are furthermore provided with arms 115, 116 respectively adapted to coöperate with the depending projections 112 and the cam surfaces 111 of the members 110 and 109 of the carrying levers 95.

On rocking the zeroizing shaft 106 in a clockwise direction by a forward zeroizing stroke of the super-totalizer zeroizing lever 108, the rod 107ᵃ of said shaft acts on the jaws 114ᵃ of the rearwardly depending arms 114 of the cam levers 111 to effect a counter clockwise rocking of said levers in unison, thereby shifting the arms 115 into engagement with the depending projections 112 and the arms 116 into engagement with the cam surfaces 111. Such movement of the arms 115 and 116 causes a depression of the forward ends of the members 110 of the carrying levers while the rear members 109 of said levers are held in their normal positions by the engagement of the arms 116 underneath their contact surfaces 111. Such forward depression of the members 110 of the carrying levers shifts the detents 97 from beneath the releasing detents 92 of the pallets 127, thereby releasing said pallets 127 from the restraining influence of the carrying levers. The result is that the carrying gears 77 of the several orders are impelled forwardly by the spring actuated segments 81, and the numeral wheels 54 are likewise impelled through the controlling pinions 56 until the lugs 94 arrive at points beneath the rear ends of the inner members 109 of the carrying levers. On release of the super-totalizer zeroizing lever 108 and a consequent counter clockwise rocking of the shaft 106 effected by the spring 106ª, the several cam levers 113 are returned to normal position by means of the rod 107ª. Before this takes place, however, the lugs 94 that are about at the zero points of the several wheels 54 have stopped said wheels 54 so that the nines appear in the sight openings of the super-totalizer numeral wheels. However, on release of the arms 116 from beneath the contact surfaces 111 of the rear members 109 of the carrying levers, carrying levers 95 of the several numeral wheels, in moving to their normal positions, again release the pallets 127 and permit the power-driven wheels 126 to move the numeral wheels 54 to zero. When the wheels 54 have regained the zero position, the lugs 94 have been moved beyond the carrying levers permitting the detents 97 to reëngage and lock the pallets 127 and pallet wheels 126.

Figure 9:
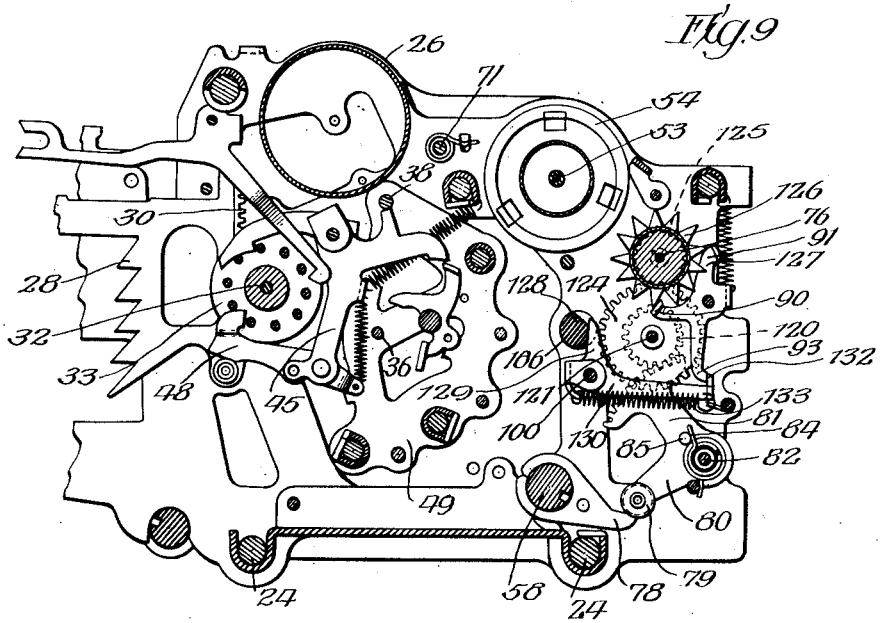
Fig. 9 is a section taken in a plane indicated by the line 9—9 of Fig. 5, illustrating the construction in the units order of the machine.

In the units order of the super-totalizer mechanism, there is no necessity for receiving carrying impulses, as there is no lower order than the units order, and, hence, the pallet mechanism and the parts which release it and control its operation function solely, to cancel or return to zero the numeral wheel 54 of the units order. Referring to the Fig. 9, which illustrates a construction employed in the units order of the super-totalizer mechanism, the rock shaft 106 that is controlled by the zeroizing lever 108 is formed with a cam-recess 128 in which works the short arm 129 of a pallet-controlling bell-crank lever 130 pivoted at the point 100. The longer arm 131 of said bell-crank lever 130 is provided at its free end with a detent 132 for the purpose of engaging the detent 93 of the pallet 127 and restraining operation of said pallet when the zeroizing lever 108 is in its normal elevated position. On operation of the zeroizing lever 108 to effect canceling, in the manner hereinbefore described, the clockwise rocking of the shaft 106 imparts a concurrent clockwise rocking of the bell-crank lever 130 about its axis 100, with the result that the detent 132 of said bell-crank lever 130 is moved out of engagement with the detent 93 of the pallet 127, thereby releasing said pallet 127. Releasing of the pallet 127 is accompanied by a concurrent release of the power spring 83 in the units order of the machine, and the released spring 83 rotates the gear segment 81 and the gearing connecting said segment 81 with the gear 54ª of the units numeral wheel 54 to restore said numeral wheel first to the "9" position, this operation being accompanied by repeated operations of the pallet mechanism including the pallet 127 and the pallet wheel 126. The units numeral wheel 54 is stopped at the "9" position by its stop 94 moving into engagement with the carrying lever 95 of the next higher order, i. e. the "tens" order. As soon as the zeroizing lever 108 is restored to its normal position the bell-crank lever 130 is concurrently restored, by the action of its return spring 133, to position for engaging the detent 93 of the pallet 127 in the units order. Movement of the zeroizing lever 106 to normal position, however, releases the carrying levers 95 of the orders above the units order by restoring to normal position the cam levers 113. The result is that the units wheel 54 is released from the restraining action of the carrying lever 95 of the "tens" order, permitting the pallet mechanism of the units order to operate once again and to move the units numeral wheel from the "9" position to the zero position. On arrival of the units wheel 54 at zero position, the pallet 127 is held against further operation by the engagement of its detent 93 with the restraining detent 132 of the bell-crank lever 131.

Figure 10:
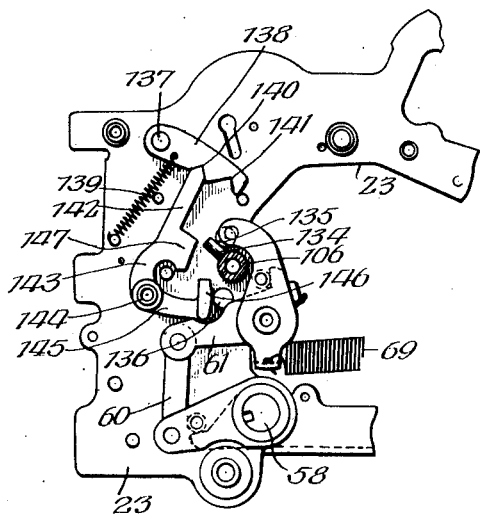
Fig. 10 is a section taken in a plane indicated by the line 10—10 of Fig. 3, illustrating mechanism for preventing over-operation of the super-totalizer zeroizing lever or crank, hereinafter more fully described.
Figure 11:
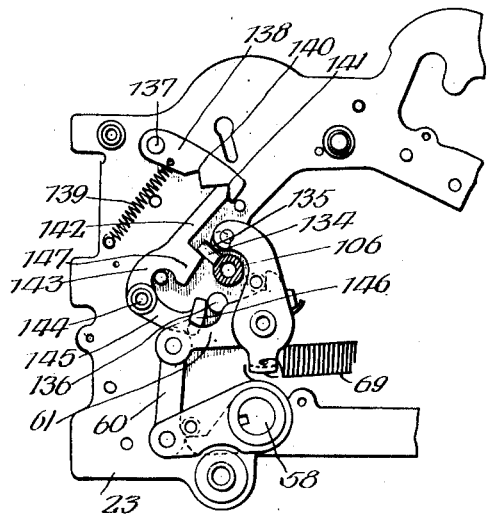
Fig. 11 is a view similar to Fig. 10, but showing the parts in a different position.
Figure 12:
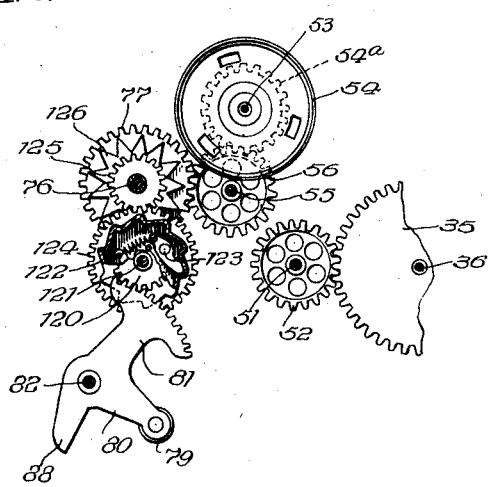
Fig. 12 is a detail view of parts of the super-totalizer registering mechanism.

From the above description, it is evident that the operation of the zeroizing lever 108 to effect canceling or zeroizing of the super-totalizer numeral wheel 54 is attended by unwinding of the power springs 83 which operate the gear segments 81. With the exception of the gear segment 81 employed in the units order of the machine, these gear segments 81 likewise function, to perform carrying operations released from lower orders of the machine to their next higher orders. Consequently it is desirable that the power springs 83 be permitted to unwind only in so far as is necessary to restore the numeral wheels 54 of the super-totalizer mechanism to zero positions or to perform the necessary carrying operations, in order that there may be not only some reserve power constantly upon the parts controlled by these power springs 83, but also that there be maintained, at all times, a proper relation of adjustment between the power springs 83 and the parts which they control. The invention provides means for maintaining proper operative relations between the power springs 83 and their controlled parts, by preventing undue and unnecessary unwinding of such springs, which would otherwise result in a release of the parts controlled by the springs and a probable destruction of the adjusted relations of these parts. For this purpose, means is provided for preventing a repetition of the operation of the zeroizing mechanism of the super-totalizer mechanism, after a zeroizing operation has been performed, until the super-totalizer lever 57 has been operated to re-wind the springs 83 that operate in the several orders of the super-totalizer mechanism. Referring more particularly to Figs. 10 and 11, the rock shaft 106 controlled by the zeroizing lever 108 is provided with a radially-projecting pin 134, adapted when said lever 108 is in its normal elevated position to engage a stop 135 and when said lever is in its depressed position to engage a stop 136, these stops serving to limit the rocking motion in either direction of the before-mentioned shaft 106. Pivoted at 137 on the fixed frame is a rocking arm 138 which is constantly urged into locking position by means of a spring 139 connecting said arm 138 with a portion of the fixed frame of the machine. The bottom edge of the rocking lever 138 is formed with a pair of teeth 140, 141 which respectively receive the upwardly-projecting arm 142 of a bell-crank controlling lever 143 pivoted at 144 on the fixed frame. The other arm 145 of said controlling lever 143 is provided at its free end with an upstanding abutment 146, whereas the arm 142 of the controlling lever is provided with an inwardly-projecting abutment 147. On movement of the rock shaft 106 to effect zeroizing or canceling, the pin 134 carried by said shaft 106 is ultimately brought into engagement with the upstanding abutment 146 of the arm 145 of the lever 143, thereby effecting a clockwise rocking movement of said lever, as viewed in Figs. 10 and 11, to move the arm 142 from engagement with the notch 140 of the rocking arm 138 into engagement with the notch 141 of said arm. As the shaft 106 returns to normal position the pin 134 engages the abutment 147 of the arm 142 of said controlling lever and shifts it somewhat against the power exerted by the spring 139, but not enough to restore the arm 142 to its former position in the notch 140 of the controlling arm 138. The result is that the arm 142 remains in the notch 141 of the rocking arm 138 and when the shaft 106 has regained its normal position further movement of said shaft to effect zeroizing is blocked by the arm 147, which while the arm 142 is in the notch 141, is in the path of the pin 134. When, however, the super-totalizer lever 57 is operated to re-wind the several springs 83 the rocking of the shaft 58 lifts the link 60 and in so doing causes the upper end of said spring 60 to engage the arm 145 of the controlling lever 143 and restore it to position, whereas the arm 142 enters the notch 140 of the rocking arm 138. In this position the abutment 147 is beyond the path of the pin 134 carried by the shaft 106 and said shaft 106 may be operated, resulting in a restoration of the lever 142 to the rocking position above described.

The calculating machine described in the above specification embodies various other instrumentalities and devices which need not herein be described for the reason that they are fully set forth in the prior patents before mentioned and in my said co-pending application.

The invention as hereinbefore set forth is embodied in a particular form of construction but may be variously embodied within the scope of the claims hereinafter made.

What is claimed is:

1. In a calculating machine provided with keys; ordinal actuating devices; ordinal registering wheels actuated by said devices; carrying springs; driving connections between said registering wheels and said actuating devices, including, driving intermeshing gears; and means for detraining said gears to permit the carrying springs to unwind and return said registering wheels to zero; in combination: an additional set of registering wheels; and means adapted, on such detraining of the driving intermeshing gears, to gear the last-mentioned registering wheels at will to said ordinal registering wheels, for turning the additional set of registering wheels, as the ordinal registering wheels are turned to zero; substantially as specified.

2. In a calculating machine provided with keys; ordinal actuating devices; ordinal registering wheels actuated by said devices; carrying springs; driving connections between said registering wheels and said actuating devices, including, driving intermeshing gears; and means for detraining said gears to permit the carrying springs to unwind and turn said registering wheels reversely to zero; in combination: an additional set of registering wheels; and means adapted, on such detraining of the driving intermeshing gears, to gear the last-mentioned registering wheels at will to said ordinal registering wheels, for turning the additional set of registering wheels forwardly as the ordinal registering wheels are being turned reversely to zero; substantially as specified.

3. In a calculating machine provided with keys; ordinal actuating devices; ordinal registering wheels actuated by said devices; carrying springs; driving connections between said registering wheels and said actuating devices, including, driving intermeshing gears; and means for detraining said gears to permit the carrying springs to unwind and return said registering wheels to zero; in combination: an additional set of registering wheels; and means for gearing the last-mentioned registering wheels at will to said ordinal registering wheels, for turning the additional set of registering wheels, as the ordinal registering wheels are turned to zero; substantially as specified.

4. In a calculating machine provided with keys; ordinal actuating devices; ordinal registering wheels actuated by said devices; carrying springs; driving connections between said registering wheels and said actuating devices, including, driving intermeshing gears; and means for detraining said gears to permit the carrying springs to unwind and return said registering wheels to zero; in combination: an additional set of registering wheels; means adapted, on such detraining of the driving intermeshing gears, to gear the last-mentioned registering wheels at will to said ordinal registering wheels, for turning the additional set of registering wheels, as the ordinal registering wheels are turned to zero; and carrying mechanism coöperating with said additional set of registering wheels; substantially as specified.

5. In a calculating machine provided with keys; ordinal actuating devices; ordinal registering wheels actuated by said devices; carrying springs; driving connections between said registering wheels and said actuating devices, including, driving intermeshing gears; and means for detraining said gears to permit the carrying springs to unwind and turn said registering wheels reversely to zero; in combination: an additional set of registering wheels; means adapted, on such detraining of the driving intermeshing gears, to gear the last-mentioned registering wheels at will to said ordinal registering wheels, for turning the additional set of registering wheels, as the ordinal registering wheels are being turned reversely to zero; and carrying mechanism coöperating with said additional set of registering wheels; substantially as specified.

6. In a calculating machine provided with keys; ordinal actuating devices; ordinal registering wheels actuated by said devices; carrying springs; driving connections between said registering wheels and said actuating devices, including, driving intermeshing gears; and means for detraining said gears to permit the carrying springs to unwind and return said registering wheels to zero; in combination: an additional set of registering wheels; means for gearing the last-mentioned registering wheels at will to said ordinal registering wheels, for turning the additional set of registering wheels, as the ordinal registering wheels are turned to zero; and carrying mechanism coöperating with said additional set of registering wheels; substantially as specified.

7. In a calculating machine provided with keys; ordinal actuating devices; ordinal registering wheels actuated by said devices; carrying springs; driving connections between said registering wheels and said actuating devices, including, driving intermeshing gears; and means for detraining said gears to permit the carrying springs to unwind and return said registering wheels to zero; in combination: an additional set of registering wheels; means adapted, on such detraining of the driving intermeshing gears, to gear the last-mentioned registering wheels at will to said ordinal registering wheels, for turning the additional set of registering wheels, as the ordinal registering wheels are turned to zero; carrying mechanism for said additional set of registering wheels; and means for delaying the operation of said carrying mechanism, while the two sets of registering wheels are entrained, and for releasing said carrying mechanism for operation on detraining of such sets of registering wheels; substantially as specified.

8. In a calculating machine provided with keys; ordinal actuating devices; ordinal registering wheels actuated by said devices; carrying springs; driving connections between said registering wheels and said actuating devices, including, driving intermeshing gears; and means for detraining said gears to permit the carrying springs to unwind and turn said registering wheels reversely to zero; in combination: an additional set of registering wheels; means adapted, on such detraining of the driving intermeshing gears, to gear the last-mentioned registering wheels at will to said ordinal registering wheels, for turning the additional set of registering wheels, as the ordinal registering wheels are being turned reversely to zero; carrying mechanism for said additional set of registering wheels; and means for delaying the operation of said carrying mechanism, while the two sets of registering wheels are entrained, and for releasing said carrying mechanism for operation on detraining of such set of registering wheels, substantially as specified.

9. In a calculating machine provided with keys; ordinal actuating devices; ordinal registering wheels actuated by said devices; carrying springs; driving connections between said registering wheels and said actuating devices, including, driving intermeshing gears; and means for detraining said gears to permit the carrying springs to unwind and return said registering wheels to zero; in combination: an additional set of registering wheels; means for gearing the last mentioned registering wheels at will to said ordinal registering wheels, for turning the additional set of registering wheels, as the ordinal registering wheels are turned to zero; carrying mechanism for said additional set of registering wheels; and means for delaying the operation of said carrying mechanism, while the two sets of registering wheels are entrained, and for releasing said carrying mechanism for operation on detraining of such sets of registering wheels; substantially as specified.

10. In a calculating machine provided with keys, ordinal actuating devices, ordinal registering wheels actuated by said devices, carrying springs, and means for releasing and permitting the carrying springs to unwind and return said registering wheels to zero, in combination: an additional set of registering wheels, and means for gearing the last-mentioned registering wheels at will to said ordinal registering wheels, when the carrying springs are released, for turning the additional set of registering wheels, as the ordinal registering wheels are turned to zero; substantially as specified.

11. In a calculating machine provided with keys, ordinal actuating devices, ordinal registering wheels actuated by said devices, carrying springs, and means for releasing and permitting the carrying springs to unwind and turn said registering wheels reversely to zero, in combination: an additional set of registering wheels, and means for gearing the last-mentioned registering wheels at will to said ordinal registering wheels, when the carrying springs are released, for turning the additional set of registering wheels forwardly as the ordinal registering wheels are turned reversely to zero; substantially as specified.

12. In a calculating machine provided with keys, ordinal actuating devices, ordinal registering wheels actuated by said devices, carrying springs, and means for releasing and permitting the carrying springs to unwind and return said registering wheels to zero, in combination: an additional set of registering wheels, means for gearing the last-mentioned registering wheels at will to said ordinal registering wheels, when the carrying springs are released, for turning the additional set of registering wheels, as the ordinal registering wheels are turned to zero, and carrying mechanism coöperating with said additional set of registering wheels; substantially as specified.

13. In a calculating machine provided with keys, ordinal actuating devices, ordinal registering wheels actuated by said devices, carrying springs, and means for releasing and permitting the carrying springs to unwind and turn said registering wheels reversely to zero, in combination: an additional set of registering wheels, and means for gearing the last-mentioned registering wheels at will to said ordinal registering wheels, when the carrying springs are released, for turning the additional set of registering wheels forwardly as the ordinal registering wheels are turned reversely to zero, and carrying mechanism coöperating with said additional set of registering wheels; substantially as specified.

14. In a calculating machine provided with keys, ordinal actuating devices, ordinal registering wheels actuated by said devices, carrying springs, and means for releasing and permitting the carrying springs to unwind and return said registering wheels to zero, in combination: an additional set of registering wheels, means for gearing the last-mentioned registering wheels at will to said ordinal registering wheels, when the carrying springs are released, for turning the additional set of registering wheels, as the ordinal registering wheels are turned to zero, carrying mechanism for said additional set of registering wheels, and means for delaying the operation of said carrying mechanism, while the two sets of registering wheels are entrained, and for releasing said carrying mechanism for operation on detraining of such sets of registering wheels; substantially as specified.

15. In a calculating machine provided with keys, ordinal actuating devices, ordinal registering wheels actuated by said devices, carrying springs, and means for releasing and permitting the carrying springs to unwind and turn said registering wheels reversely to zero, in combination: an additional set of registering wheels, means for gearing the last-mentioned registering wheels at will to said ordinal registering wheels, when the carrying springs are released, for turning the additional set of registering wheels forwardly as the ordinal registering wheels are turned reversely to zero, carrying mechanism for said additional set of registering wheels, and means for delaying the operation of said carrying mechanism, while the two sets of registering wheels are entrained, and for releasing said carrying mechanism for operation on detraining of such sets of registering wheels; substantially as specified.

16. In a calculating machine provided with keys, ordinal actuating devices, ordinal registering wheels actuated by said devices, carrying springs, driving connections between said registering wheels and said actuating devices, including, driving intermeshing gears, a swinging frame for detraining said gears to permit the carrying springs to unwind and return said ordinal registering wheels to zero, and means for so swinging said frame, in combination: an additional set of registering wheels, and means for gearing the last-mentioned registering wheels at will to said ordinal registering wheels, when said frame is swung into position for detraining the driving intermeshing gears, for turning the additional set of registering wheels, as the ordinal registering wheels are turned to zero; substantially as specified.

17. In a calculating machine provided with keys, ordinal actuating devices, ordinal registering wheels actuated by said devices, carrying springs, driving connections between said registering wheels and said actuating devices, including, driving intermeshing gears, a swinging frame for detraining said gears to permit the carrying springs to unwind and turn said ordinal registering wheels reversely to zero, and means for so swinging said frame, in combination: an additional set of registering wheels, and means for gearing the last-mentioned registering wheels at will to said ordinal registering wheels, when said frame is swung into position for detraining the driving intermeshing gears, for turning the additional set of registering wheels forwardly, as the ordinal registering wheels are turned reversely to zero; substantially as specified.

18. In a calculating machine provided with keys, ordinal actuating devices, ordinal registering wheels actuated by said devices, carrying springs, driving connections between said registering wheels and said actuating devices, including, driving intermeshing gears, a swinging frame for detraining said gears to permit the carrying springs to unwind and turn said ordinal registering wheels reversely to zero, and means for so swinging said frame, in combination: an additional set of registering wheels, means for gearing the last-mentioned registering wheels at will to said ordinal registering wheels, when said frame is swung into position for detraining the driving intermeshing gears, for turning the additional set of registering wheels forwardly, as the ordinal registering wheels are turned reversely to zero, and carrying mechanism coöperating with said additional set of registering wheels; substantially as specified.

19. In a calculating machine provided with keys, ordinal actuating devices, ordinal registering wheels actuated by said devices, carrying springs, driving connections between said registering wheels and said actuating devices, including, driving intermeshing gears, a swinging frame for detraining said gears to permit the carrying springs to unwind and return said ordinal registering wheels to zero, and means for so swinging said frame, in combination: an additional set of registering wheels, means for gearing the last-mentioned registering wheels at will to said ordinal registering wheels, when said frame is swung into position for detraining the driving intermeshing gears, for turning the additional set of registering wheels, as the ordinal registering wheels are turned to zero, and carrying mechanism coöperating with said additional set of registering wheels; substantially as specified.

20. In a calculating machine provided with a set of ordinal registering wheels, and means for turning said wheels from varying positions to zero positions, in combination: an additional set of registering wheels, means for gearing the last-mentioned registering wheels at will to said ordinal registering wheels, for turning the additional set of registering wheels, as the ordinal registering wheels are turned to zero, and carrying mechanism individual to and coöperating with said additional set of registering wheels independently of the operation of said first-mentioned ordinal registering wheels; substantially as specified.

21. In a calculating machine provided with a set of ordinal registering wheels, and means for turning said wheels from varying positions to zero positions, in combination: an additional set of registering wheels, means for gearing the last-mentioned registering wheels at will to said ordinal registering wheels, for turning the additional set of registering wheels, as the ordinal registering wheels are turned to zero, carrying mechanism for said additional set of registering wheels, and means for delaying the operation of said carrying mechanism, while the two sets of registering wheels are entrained, and for releasing said carrying mechanism for operation on detraining of such sets of registering wheels; substantially as specified.

22. In a calculating machine provided with a set of ordinal register wheels, and means for turning said wheels reversely from varying positions to zero positions, in combination: an additional set of registering wheels, means for gearing the last-mentioned registering wheels at will to said ordinal registering wheels, for turning the additional set of registering wheels forwardly, as the ordinal registering wheels are turned reversely to zero, and carrying mechanism individual to and coöperating with said additional set of registering wheels independently of the operation of said first mentioned ordinal registering wheels; substantially as specified.

23. In a calculating machine provided with a set of ordinal register wheels, and means for turning said wheels reversely from varying positions to zero positions, in combination: an additional set of registering wheels, means for gearing the last-mentioned registering wheels at will to said ordinal registering wheels, for turning the additional set of registering wheels forwardly, as the ordinal registering wheels are turned reversely to zero, carrying mechanism for said additional set of registering wheels, and means for delaying the operation of said carrying mechanism, while the two sets of registering wheels are entrained, and for releasing said carrying mechanism for operation on detraining of such sets of registering wheels; substantially as specified.

24. In a calculating machine provided with a set of ordinal registering wheels, and means for turning said wheels from varying positions to zero positions, in combination: an additional set of registering wheels, carrying mechanism therefor, and means operable for gearing either the carrying mechanism or said ordinal registering wheels to said additional set of registering wheels; substantially as specified.

25. In a calculating machine provided with a set of ordinal registering wheels, and means for turning said wheels from varying positions to zero positions, in combination: an additional set of registering wheels, carrying mechanism therefor, means operable for gearing either the carrying mechanism or said ordinal registering wheels to said additional set of registering wheels, and means for delaying the operation of the carrying mechanism, while the latter is detrained from said additional set of registering wheels; substantially as specified.

26. In a calculating machine provided with a set of ordinal registering wheels, and means for turning said wheels from varying positions to zero positions, in combination: an additional set of registering wheels, carrying mechanism therefor, and a unitary operating means for gearing either the carrying mechanism or said ordinal registering wheels to said additional set of registering wheels; substantially as specified.

27. In a calculating machine provided with a set of ordinal registering wheels, and means for turning said wheels from varying positions to zero positions, in combination: an additional set of registering wheels, a motor-operated carrying mechanism therefor, means operable for gearing either the carrying mechanism or said ordinal registering wheels to said additional set of registering wheels, and means for releasing power of said carrying mechanism to turn said additional set of registering wheels to zero positions; substantially as specified.

28. In a calculating machine provided with a set of ordinal registering wheels, and means for turning said wheels from varying positions to zero positions, in combination: an additional set of registering wheels, a motor-operated carrying mechanism therefor, means operable for gearing either the carrying mechanism or said ordinal registering wheels to said additional set of registering wheels, means for delaying the operation of the carrying mechanism, while the latter is detrained from said additional set of registering wheels, and means for releasing power of said carrying mechanism to turn said additional set of registering wheels to zero positions; substantially as specified.

29. In a calculating machine provided with a set of ordinal registering wheels, and means for turning said wheels from varying positions to zero positions, in combination: an additional set of registering wheels, carrying mechanism therefor, means operable for gearing either the carrying mechanism or said ordinal registering wheels to said additional set of registering wheels, and zeroizing mechanism for said additional set of registering wheels; substantially as specified.

30. In a calculating machine provided with a set of ordinal registering wheels, and means for turning said wheels from varying positions to zero positions, in combination: an additional set of registering wheels, carrying mechanism therefor, means operable for gearing either the carrying mechanism or said ordinal registering wheels to said additional set of registering wheels, means for delaying the operation of the carrying mechanism, while the latter is detrained from said additional set of registering wheels, and zeroizing mechanism for said additional set of registering wheels; substantially as specified.

31. In a calculating machine provided with a set of ordinal registering wheels, and means for turning said wheels from varying positions to zero positions, in combination: an additional set of registering wheels, carrying mechanism therefor, means for controlling the operation of said carrying mechanism in the individual orders of said last named set of registering wheels, means operable for gearing either the carrying mechanism or said ordinal registering wheels to said additional set of registering wheels, and a second controlling mechanism for said carrying mechanism common to all the individual orders thereof, and under the control of the aforesaid gearing means; substantially as specified.

32. In a calculating machine provided with a set of ordinal registering wheels, and means for turning said wheels from varying positions to zero positions, in combination: an additional set of registering wheels, carrying mechanism therefor, means for controlling the operation of said carrying mechanism in the individual orders of said last named set of registering wheels, means operable for gearing either the carrying mechanism or said ordinal registering wheels to said additional set of registering wheels, and a second controlling mechanism for said carrying mechanism common to all the individual orders thereof, and adapted to delay the operation of the carrying mechanism, while the latter is detrained from said additional set of registering wheels; substantially as specified.

33. In a calculating machine, in combination: a set of ordinal accumulator registering wheels rotatable on a fixed axis, including gearing for turning them; means for turning said wheels from varying positions to zero positions; an additional set of registering wheels also rotatable on a fixed axis; means for moving gearing of said first set of registering wheels into position for being entrained with said last named set of registering wheels; and means for entraining said last named set of registering wheels with said first named set of registering wheels, when gearing of the latter has been moved into such entraining position; substantially as specified.

34. In a calculating machine, in combination: a set of ordinal accumulator registering wheels rotatable on a fixed axis, an additional set of registering wheels also rotatable on a fixed axis and including gearing for turning them, means for shifting gearing of said first named set of registering wheels to permit turning of the latter from varying positions to zero position and to move them simultaneously into position for being entrained with said second named set of registering wheels; and means for entraining said second named set of registering wheels with said first named set of registering wheels, when gearing of the latter has been moved into such entraining position; substantially as specified.

35. In a calculating machine, in combination: two independent sets of registering mechanisms one adapted to be turned by the other; and means controlled by both sets of registering mechanisms for gearing them together; substantially as specified.

36. In a calculating machine, in combination: an ordinal registering mechanism; an additional registering mechanism intermittently driven by power stored in the first-named registering mechanism; means for gearing the two registering mechanisms together whereby one registering mechanism may be driven by the other; and structurally independent carrying mechanisms incorporated individually in and under the individual control of said two registering mechanisms; substantially as specified.

37. In a calculating machine provided with a set of registering wheels rotatable on a fixed axis, including gearing for turning them; and means adapted to shift gearing of such registering wheels and turn them to zero positions; in combination: an additional set of registering wheels also rotatable on a fixed axis; and means adapted, on such shifting of gearing of said first-mentioned registering wheels, to entrain them at will with said additional registering wheels, for turning the latter, as the first-mentioned registering wheels are turned to zero; substantially as specified.

38. In a calculating machine provided with a set of registering wheels including gearing mounted on a shiftable axis; and means adapted to shift the axis of such gearing laterally and permit the aforesaid wheels to turn to zero positions; in combination: an additional set of registering wheels; and means adapted, on axial shifting of said gearing to gear the registering wheels at will to said additional registering wheels, for turning the latter, as the first-mentioned registering wheels are turned to zero; substantially as specified.

39. In a calculating machine provided with a set of registering wheels rotatable on a fixed axis, including gearing for turning them; and means adapted to shift such gearing and permit the registering wheels to turn to zero positions, in combination: an additional set of registering wheels also rotatable on a fixed axis; means adapted, on such gear shifting to gear the aforesaid registering wheels at will to said additional registering wheels, for turning the latter, as the first-mentioned registering wheels are turned to zero; and carrying mechanism coöperating with said additional set of registering wheels; substantially as specified.

40. In a calculating machine provided with a set of registering wheels, including gearing mounted on a shiftable axis; and means adapted to shift the axis of such gearing laterally and permit the registering wheels to turn to zero positions, in combination: an additional set of registering wheels; means adapted on axial shifting of said gearing, to gear the aforesaid registering wheels at will to said additional registering wheels, for turning the latter, as the first-mentioned registering wheels are turned to zero; and carrying mechanism coöperating with said additional set of registering wheels; substantially as specified.

41. In a calculating machine provided with a set of registering wheels, including gearing for turning them; and means adapted to shift such gearing and permit the registering wheels to turn reversely to zero positions; in combination: an additional set of registering wheels; and means adapted, on such gear shifting, to gear the aforesaid registering wheels at will to said additional registering wheels, for turning the latter forwardly, as the first-mentioned registering wheels are turned reversely to zero; substantially as specified.

42. In a calculating machine provided with a set of registering wheels, including gearing mounted on a shiftable axis; and means adapted to shift the axis of such gearing laterally and permit the registering wheels to turn reversely to zero positions; in combination: an additional set of registering wheels; and means adapted, on axial shifting of said gearing, to gear the aforesaid registering wheels at will to said additional registering wheels, for turning the latter forwardly, as the first-mentioned registering wheels are turned reversely to zero; substantially as specified.

43. In a calculating machine provided with a set of registering wheels including gearing mounted on a shiftable axis; means for shifting the axis of such gearing laterally; and means, releasable on such axial shifting, for turning the registering wheels to zero positions; in combination: an additional set of registering wheels; and means adapted, on axial shifting of said gearing, to gear the aforesaid registering wheels at will to said additional registering wheels for turning the latter, as the first-mentioned registering wheels are turned to zero; substantially as specified.

44. In a calculating machine provided with a set of registering wheels including gearing mounted on a shiftable axis; means for shifting the axis of such gearing laterally; and means, releasable on such axial shifting, for turning the registering wheels to zero positions; in combination: an additional set of registering wheels; means adapted, on axial shifting of said gearing to gear the aforesaid registering wheels at will to said additional registering wheels for turning the latter, as the first-mentioned registering wheels are turned to zero; and carrying mechanism coöperating with said additional set of registering wheels; substantially as specified.

45. In a calculating machine provided with a set of registering wheels, including gearing for turning them; and means adapted to shift such gearing and permit the registering wheels to turn to zero position; in combination: an additional set of registering wheels; means adapted, on such gear shifting to gear the aforesaid registering wheels at will to said additional set of registering wheels, for turning the latter, as the first-mentioned registering wheels are turned to zero; carrying mechanism for said additional set of registering wheels; and means for preventing operation of said carrying mechanism, when the two sets of registering wheels are geared together, and for releasing such carrying mechanism on detraining of said two sets of registering wheels; substantially as specified.

46. In a calculating machine provided with a set of registering wheels, including gearing for turning them; and means adapted to shift such gearing and permit the registering wheels to turn to zero position; in combination: an additional set of registering wheels; means adapted, on such gear shifting to gear the aforesaid registering wheels at will to said additional registering wheels, for turning the latter, as the first-mentioned registering wheels are turned to zero; carrying mechanism for said additional set of registering wheels; and means for delaying the operation of said carrying mechanism, while said additional set of registering wheels are being turned by said first-mentioned set of registering wheels; substantially as specified.

47. In a calculating machine provided with a set of registering wheels; and means for turning such registering wheels from various positions to zero positions, in combination: an additional set of registering wheels; means adapted, to gear the latter at will to said first-mentioned registering wheels, for turning thereby, as the first-mentioned registering wheels are turned to zero; carrying mechanism for said additional set of registering wheels; and means for delaying the operation of said carrying mechanism, while said additional set of registering wheels are being turned by said first-mentioned set of registering wheels; substantially as specified.

48. In a calculating machine provided with a set of registering wheels; and means for turning such registering wheels from various positions to zero positions; in combination: an additional set of registering wheels; means adapted, to gear the latter at will to said first-mentioned registering wheels, for turning thereby, as the first-mentioned registering wheels are turned to zero; carrying mechanism for said additional set of registering wheels; and means for controlling the operation of said carrying mechanism concurrently with the gearing together of said two sets of registering wheels; substantially as specified.

49. In a calculating machine provided with a set of registering wheels; and means for turning such registering wheels from various positions to zero positions; in combination: an additional set of registering wheels; means adapted, to gear the latter at will to said first-mentioned registering wheels, for turning thereby, as the first-mentioned registering wheels are turned to zero; and carrying mechanism for said additional set of registering wheels controlled in its operation by said first-mentioned set of registering wheels, when the latter are geared with said additional set of registering wheels; substantially as specified.

50. In a calculating machine provided with a set of registering wheels; and means for turning such registering wheels from various positions to zero positions; in combination: an additional set of registering wheels; means adapted, to gear the latter at will to said first-mentioned registering wheels, for turning thereby, as the first-mentioned registering wheels are turned to zero; carrying mechanism for said additional set of registering wheels; means coöperating individually with the individual orders of said additional set of registering wheels for controlling individual operations of said carrying mechanism; and means for controlling said carrying mechanism collectively, while said additional set of registering wheels are being turned by said first-mentioned set of registering wheels; substantially as specified.

51. In a calculating machine provided with a set of registering wheels; and means for turning such registering wheels from various positions to zero positions; in combination: an additional set of registering wheels; means adapted, to gear the latter at will to said first-mentioned registering wheels, for turning thereby, as the first-mentioned registering wheels are turned to zero; carrying mechanism for said additional set of registering wheels; means coöperating individually with the individual orders of said additional set of registering wheels for controlling individual operations of said carrying mechanism; and means for delaying the operation of said carrying mechanism, while said additional set of registering wheels are being turned by said first-mentioned set of registering wheels; substantially as specified.

52. In a calculating machine provided with a set of registering wheels, including gearing for turning them; and means adapted to shift such gearing and permit the registering wheels to turn to zero position; in combination: an additional set of registering wheels; means adapted, on such gear shifting to gear the aforesaid registering wheels at will to said additional registering wheels, for turning the latter, as the first-mentioned registering wheels are turned to zero; carrying mechanism for said additional set of registering wheels; means for delaying the operation of said carrying mechanism, while said additional set of registering wheels are being turned by said first-mentioned set of registering wheels, and means for releasing said carrying mechanism to turn said additional set of registering wheels to zero; substantially as specified.

53. In a calculating machine provided with a set of registering wheels, including gearing for turning them; and means adapted to shift such gearing and permit the registering wheels to turn to zero position; in combination: an additional set of registering wheels; means adapted, on such gear shifting, to gear the aforesaid registering wheels at will to said additional registering wheels, for turning the latter, as the first-mentioned registering wheels are turned to zero; carrying mechanism for said additional set of registering wheels; and means for releasing said carrying mechanism to turn said additional set of registering wheels to zero; substantially as specified.

54. In a calculating machine provided with a set of registering wheels, including gearing for turning them; and means adapted to shift gearing of such registering wheels and turn them to zero position; in combination: an additional set of registering wheels; means adapted on shifting of gearing of said first-mentioned registering wheels, to entrain them at will with said additional registering wheels, for turning the latter as the first-mentioned registering wheels are turned to zero; carrying mechanism for said additional set of registering wheels; and zeroizing mechanism for said additional set of registering wheels; substantially as specified.

55. In a calculating machine provided with a set of registering wheels; and means for turning such registering wheels from various positions to zero positions; in combination: an additional set of registering wheels; means adapted to gear the latter at will to said first-mentioned registering wheels, for turning thereby, as the first-mentioned registering wheels are turned to zero; carrying mechanism for said additional set of registering wheels; means for disconnecting said carrying mechanism from said additional set of registering wheels, when the latter are geared to said first-mentioned set of registering wheels; and means for delaying the operation of said carrying mechanism, while so disconnected; substantially as specified.

56. In a calculating machine provided with a set of registering wheels; and means for turning such registering wheels from various positions to zero positions; in combination: an additional set of registering wheels means adapted to gear the latter at will to said first-mentioned registering wheels, for turning thereby, as the first-mentioned registering wheels are turned to zero; carrying mechanism controlled by lower orders of said additional set of registering wheels for imparting carrying impulses to their next higher orders; means, operable while both sets of registering wheels are geared together, for disconnecting the carrying mechanism from the next higher orders, while preserving the control by the lower orders of said additional set of registering wheels; and means for preventing escape of carrying impulses, while the carrying mechanism is so disconnected from the next higher orders of said additional set of registering wheels; substantially as specified.

57. In a calculating machine provided with a set of registering wheels; and means for turning said registering wheels from various positions to zero positions; in combination: an additional set of registering wheels; means adapted, to gear the latter at will to said first-mentioned registering wheels, for turning thereby, as the first-mentioned registering wheels are turned to zero; carrying mechanism controlled by lower orders of said additional set of registering wheels for imparting carrying impulses to their next higher orders; means, operable while both sets of registering wheels are geared together, for disconnecting the carrying mechanism from the next higher orders while preserving the control by the lower orders of said additional set of registering wheels; and means for delaying the carrying operation, while the carrying mechanism is so disconnected from the next higher orders of said additional set of registering wheels; substantially as specified.

58. In a calculating machine provided with a set of registering wheels; and means for turning such registering wheels from various positions to zero positions; in combination: an additional set of registering wheels; means adapted to gear the latter at will to said first-mentioned registering wheels, for turning thereby, as the first-mentioned registering wheels are turned to zero; carrying mechanism controlled by lower orders of said additional set of registering wheels for imparting carrying impulses to their next higher orders; and means, operable while both sets of registering wheels are geared together for delaying the release of carrying mechanism to the next higher orders, while preserving the control by the lower orders of said additional set of registering wheels; substantially as specified.

59. In a calculating machine provided with a set of registering wheels; and means for turning said registering wheels from various positions to zero positions; in combination: an additional set of registering wheels; means adapted, to gear the latter at will to said first-mentioned registering wheels, for turning thereby, as the first-mentioned registering wheels are turned to zero; carrying mechanism for said additional set of registering wheels, including, a plurality of individual motor-driven members for imparting carrying impulses to the individual orders of said additional set of registering wheels; control devices coöperating with the individual orders of said registering wheels for releasing the carrying impulses of said motor members individually; and means for effecting a collective release of the motor members of the carrying mechanism, for turning the additional set of registering wheels to zero; substantially as specified.

60. In a calculating machine provided with a set of registering wheels; and means for turning said registering wheels from various positions to zero positions; in combination: an additional set of registering wheels; means adapted, to gear the latter at will to said first-mentioned registering wheels, for turning thereby, as the first-mentioned registering wheels are turned to zero; carrying mechanism for said additional set of registering wheels, including, a plurality of individual motor-driven members for imparting carrying impulses to the individual orders of said additional set of registering wheels; control devices coöperating with the individual orders of said registering wheels for releasing the carrying impulses of said motor members individually; and means for releasing all of the motor members simultaneously, for effecting the release of carrying in the several orders of the additional set of registering wheels to turn the latter to zero; substantially as specified.

61. In a calculating machine provided with a set of registering wheels; and means for turning said registering wheels from various positions to zero positions; in combination: an additional set of registering wheels; means adapted, to gear the latter at will to said first-mentioned registering wheels, for turning thereby, as the first-mentioned registering wheels are turned to zero; carrying mechanism for said additional set of registering wheels, including, a plurality of individual motor-driven members for imparting carrying impulses to the individual orders of said additional set of registering wheels; control devices coöperating with the individual orders of said registering wheels for releasing the carrying impulses of said motor members individually; means for releasing all of the motor members simultaneously, for effecting the release of carrying in the several orders of the additional set of registering wheels to turn the latter to zero; and means for stopping such registering wheels when they individually arrive at zero position; substantially as specified.

62. In a calculating machine provided with a set of ordinal registering wheels, and means for turning said wheels reversely from varying positions to zero positions, in combination: an additional set of registering wheels, means for gearing the last-mentioned registering wheels at will to said ordinal registering wheels, for turning the additional set of registering wheels forwardly, as the ordinal registering wheels are turned reversely to zero, zeroizing mechanism for said additional set of registering wheels, and means controlled by said gearing means for releasing said zeroizing mechanism for operation at will; substantially as specified.

63. In a calculating machine provided with a set of ordinal registering wheels, and means for turning said wheels reversely from varying positions to zero positions, in combination: an additional set of registering wheels, means for gearing the last-mentioned registering wheels at will to said ordinal registering wheels, for turning the additional set of registering wheels forwardly, as the ordinal registering wheels are turned reversely to zero, zeroizing mechanism for said additional set of registering wheels, and means for preventing repeated operations of said zeroizing mechanism between successive operations of said gearing means; substantially as specified.

64. In a calculating machine provided with a set of registering wheels, including gearing for driving them; and means adapted to shift gearing of such registering wheels and turn them to zero position; in combination: an additional set of registering wheels; means adapted, on such shifting of gearing of said first-mentioned registering wheels, to entrain them at will with said additional registering wheels, for turning the latter, as the first-mentioned registering wheels are turned to zero; carrying mechanism for said additional set of registering wheels; means for turning said additional set of registering wheels to zero by effecting release of said carrying mechanism; and means for preventing repeated zeroizing operations of said additional set of registering wheels, between successive operations of said gearing means; substantially as specified.

65. In a calculating machine provided with a set of registering wheels, including gearing for driving them; and means adapted to shift gearing of such registering wheels and turn them to zero position; in combination: an additional set of registering wheels; means, adapted, on such shifting of gearing of said first-mentioned registering wheels to entrain them at will with said additional registering wheels, for turning the latter, as the first-mentioned registering wheels are turned to zero; carrying mechanism for said additional set of registering wheels; means for turning said additional set of registering wheels to zero by effecting release of said carrying mechanism; and means operatively disposed between said gearing means and the zeroizinz means of the additional set of registering wheels, for releasing such zeroizing means for operation at will subsequent to an operation of said gearing means and for preventing further operation of such zeroizing means, unless released by a subsequent operation of said gearing means; substantially as specified.

66. In a calculating-machine, in combination: key-driven actuating mechanism; accumulator-mechanism driven by said key-driven actuating mechanism, for the accumulation of individual totals, said accumulator-mechanism being permanently positioned and operating in fixed ordinal places in the machine; super-totalizer accumulator mechanism embodying means for accumulating the individual totals of the key-driven accumulator mechanism into a grand total; means operable at will for entraining said accumulator mechanisms, to permit transfer of an individual total from the key-driven to the super-totalizer accumulator mechanism; and driving means acting independently of the aforesaid key-actuation and coöperating with said key-driven accumulator mechanism for affecting the transfer of the individual total to said super-totalizer accumulator mechanism; substantially as specified.

67. In a calculating-machine, in combination: key-driven actuating mechanism; accumulator-mechanism driven by said key-driven actuating mechanism, for the accumulation of individual totals, said accumulator-mechanism being permanently positioned and operating in fixed ordinal places in the machine; super-totalizer accumulator mechanism embodying means for accumulating the individual totals of the key-driven accumulator mechanism into a grand total; means operable at will for entraining said accumulator mechanisms, to permit transfer of an individual total from the key-driven to the super-totalizer accumulator mechanism; and means for storing power in said key-driven accumulator mechanism, during key actuation thereof, to provide power for effecting the transfer of the individual total to said super-totalizer accumulator mechanism; substantially as specified.

68. In a key-driven calculator; accumulator-mechanism capable of receiving and storing power, a series of actuators for storing power in said accumulator-mechanism, in combination with a second accumulator mechanism adapted to receive the power stored in the first accumulator mechanism to register a total, substantially as specified.

69. In a calculating machine, in combination: a key-driven ordinal accumulator registering mechanism; an additional accumulator registering mechanism adapted to be driven intermittently by power stored in said first-named registering mechanism; and means operable at will for gearing said two registering mechanisms together; substantially as specified.

70. In a calculator, a series of register wheels, carrying springs for actuating said wheels in a carrying of the tens, and means whereby the said carrying springs themselves may turn the register wheels in forward direction advancing from divers numerical positions to zero, to effect a zeroizing operation; substantially as specified.

71. In a key-driven calculator: accumulator-mechanism capable of receiving and storing power, a series of actuators for operating and concurrently storing power in said accumulator-mechanism, in combination with a second accumulator-mechanism, and means for connecting the second accumulator-mechanism with the first, to permit the power stored in the first accumulator-mechanism to transfer a total to the second accumulator-mechanism; substantially as specified.

72. In a calculator, a series of register wheels, releasable carrying springs for actuating said wheels forwardly in a carrying of the tens, means for releasing said springs individually to perform carrying, and other means for effecting simultaneous release of all the carrying springs in their forward motion-producing function, whereby the said carrying springs themselves may turn the register wheels in forward direction, advancing from divers numerical positions to zero, to effect a zeroizing operation; substantially as specified.

JOSEPH A. V. TURCK.